Jan. 7, 1969   R. H. OVERSMITH   3,420,202

UNDERWATER CRAFT AND SUBMERGED PROPULSION SYSTEMS

Filed May 3, 1965

INVENTOR.
ROBERT H. OVERSMITH
BY Carl R. Brown
ATTORNEY

United States Patent Office 3,420,202
Patented Jan. 7, 1969

3,420,202
UNDERWATER CRAFT AND SUBMERGED
PROPULSION SYSTEMS
Robert H. Oversmith, 1315 Alexandria Drive,
San Diego, Calif. 92107
Filed May 3, 1965, Ser. No. 452,557
U.S. Cl. 114—16                                    8 Claims
Int. Cl. B63h 21/14; B63h 5/00

ABSTRACT OF THE DISCLOSURE

An internal combustion engine is disposed in an open bottomed housing. A compressed air source provides air to the housing for use by the engine. A float controls the level of water in the housing.

---

This inventon relates to an underwater craft and submerged propulsion system and more particularly to an underwater craft and submerged propulsion system that is simple and easy to operate under water without any connection to the surface air and which propulsion system uses an internal combustion engine.

There have been many recent advances in the development of craft for travelling under water. These advances have concerned not only the shape of the craft but also its propulsion system. However, little has been done in developing an efficient system for propelling a small craft under water which craft does not have an air line or the like connecting to the surface air. While nuclear power systems have made it possible to propel large craft under water for long periods of time without requiring an air transmitting connection with the surface air, nuclear engines are complicated, expensive and are limited in use to large and enclosed submersible craft.

The known propulsion system constructions for propelling an underwater craft, other than nuclear engines, have great difficulty in developing sufficient power to efficiently and effectively propel even small simple underwater craft for any extended period of time. Most of such propulsion systems use batteries when the craft is completely submerged. Such craft can only use internal combustion engines for propulsion power by having a conduit that provides a direct air passage between the engine and the surface air. This conduit is known as a snorkel. The inefficiency and short range resulting from use of batteries to drive a propulsion unit are well known. Unless some other power source is used to recharge the batteries and the battery unit is large, the batteries are seriously limited in range and power. Other propulsion engines such as compressed air driven engines and the like, have been used to move diving bells and small open craft. However, the gross inefficiency of such engines and their lack of range or capacity along with their bulky size, limits their use.

All of the developments heretofore made have not satisfied the need for an engine that is small in size, quick and easy to use, efficient in operation and that can be used to propel various small or relatively small underwater craft over a considerable range and without requiring an air transmitting connection with the surface air.

Therefore it is an object of this invention to provide an improved and novel underwater craft.

It is another object of this invention to provide an improved and novel combination underwater craft and propulsion system.

It is another object of this invention to provide an improved and novel propulsion system for propelling underwater crafts.

It is another object of this invention to provide a novel and improved internal combustion engine propulsion system for an underwater craft that does not require an air passage connection with the surface air.

It is another object of this invention to provide a novel and improved propulsion unit for an underwater craft that is small in size, efficient in operation, simple to make and maintain, and that has a relatively long range.

It is another object of this invention to provide a novel and improved propulsion unit for an underwater craft that is capable of using the well known outboard engine or the like for the power source.

This invention concerns an underwater craft that is simple, yet reliable and easy to make and use. It may be operated by one man from a dock with man using scuba diving gear. The craft is light and can be easily lifted from the water. When placed in use the operator sits, substantially submerged, on the craft. The craft and operator are supported by floats. The engine is then started and the craft guided to travel under water against the buoyancy of the floats. The diving plane and rudder controls are simple and may be operated with one hand. Upon completing the underwater trip, the craft is guided to the surface by the guiding mechanism. The floats assure that the craft returns to the surface.

The underwater craft of this invention has a unique propulsion system that employs an internal combustion engine as the power source. The internal combustion engine is housed in an air filled container that is mounted on or in the submersible craft. The sides and the top of the container are air tight and selectively the containers bottom side may either be sealed or be open to the water surrounding the craft.

The craft carries supplies of compressed air and fuel that may be mounted either inside the container or outside the container on the craft. The engine uses the air within the container for combustion. The compressed air replenishes the air within the container primarily lost to the engine intake through a valve control means. The valve control means is actuated in the open container embodiment by a float that rides on the water level within the container. The float in responding to the water level allows air to enter the container in proportion to that amount removed by operation of the engine. Also additional small quantities of air are injected into the container to maintain the water at a given level in the container regardless of the change in hydro-static pressure. The engine exhausts outside the container and directly into the water and drives a propeller, water jet or the like to propel the craft.

In the sealed container embodiment, the valve may be connected via a water conducting passage to the air control valve. The valve has a pressure sensitive mechanism that detects the pressure differential between the outside wall and the air pressure inside the sealed container. The pressure sensitive mechanism controls the opening of the valve and thus the volume of the air in the container.

In still another embodiment, the air control valve is merely pressure sensitive and there is no connection with the outside water pressure. The air replenished in the container is then directly proportional to the air consumed, since the valve control mechanism is responsive only to the decreased air pressure within the container.

The air volume or pressure within the container is controlled solely by the control valve. This valve not only compensates for that increase in hydro-static pressure because of the depth of the propulsion unit in the water, but also because of the air removed from the air environment by the engine. It should be recognized that while the increased water pressure causes an increased air pressure in the air environment thus tending to supercharge the engine, the air mixture does not become too disproportionate because of the increased exhaust pressure resulting from the engine exhausting into the water at the greater depth. However, the embodiment that has the air pressure controlled within the container, establishes a constant air fuel mixture for the intake part of the engine.

The foregoing stated features and other details of this invention will be explained in the following detailed specification, reference being had to the accompanying drawings, in which.

Figure 1:
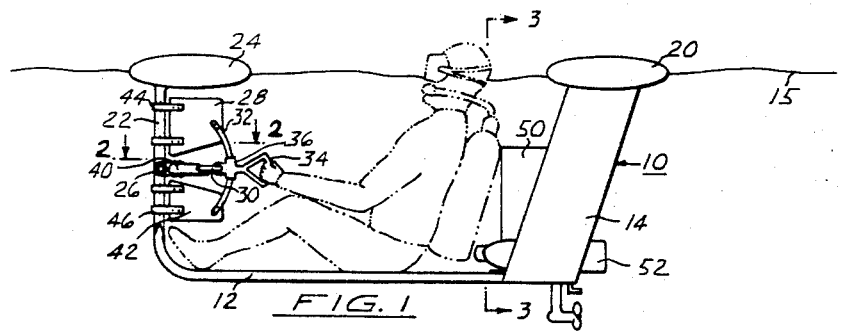
FIGURE 1 is a side view in elevation of an embodiment of this invention.
Figure 2:
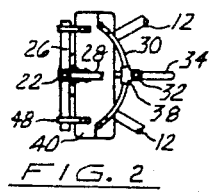
FIGURE 2 is a view taken along lines 2—2 of FIGURE 1.
Figure 3:
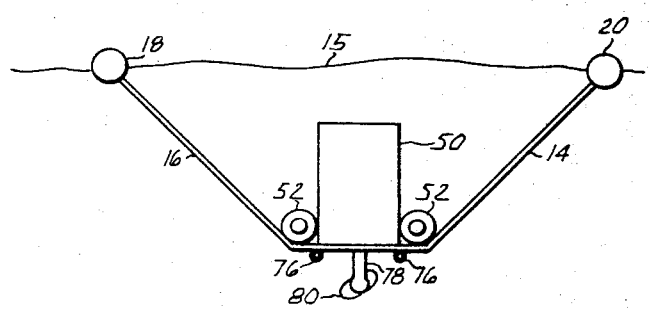
FIGURE 3 is an end view of the embodiment of the invention shown in FIGURE 1.

Referring now to FIGURE 1 there is shown an open one-man, underwater craft that has longitudinal members 12 that may be made of wood, metal plate or, as shown in FIGURE 2, of tubing that has a wood board, metal plate or the like spaced there between and supported by the tubing members 12 in a manner that the user may be supported thereon as shown. At one end of the longitudinal members 12, a forward support 22 projects upwardly at a substantially normal angle to the longitudinal members 12. The forward support member 22 may be constructed from tubing or the like that is either welded, joined, fastened or otherwise secured to the longitudinal members 12 in a rigid manner. There is secure to the other end of the longitudinal members, stabilizers 14 and 16 that project outwardly and upwardly. The forward support tube 22 and the stabilizers 14 and 16 all terminate at substantially the same height above the longitudinal member 12, and on the end of each of the forward support and stabilizer members in mounted floats 18, 20 and 24. Floats 18, 20 and 24 have sufficient buoyancy to support the craft 10 and the operator at the established distance below the surface of the water 15. The stabilizing members 14 and 16 have sufficient width and reduced thickness to function as stabilizing planes in the water environment.

The forward support tube 22 has secured thereto by brackets 44 and 46 rudder plates 28 and 42. The rear of said plates 28 and 42 are connected together by the arcuate vertically positioned control member 32. Control member 32 is moved in a horizontal plane by the operator grasping hand ring 34 and moving the control member 32 and the rudder plates 28 and 42 to the right or left in the horizontal plane. For driving control arcuate tube member 30 is secured to the rear portion of diving plane 40. Slip ring 38 that is integral with control member 32 slides on and is guided by member 30. Thus it it evident that the rudder and diving planes may be controlled in all of their movements by a single coordinated control 34.

At the other end of the underwater craft there is mounted directly on to the longitudinal support 12 an air tight housing 50. Housing 50 may be made of any suitable material such as metal, plastic or the like that is water tight and not subject to water corrosion. Enclosed in housing 50 is an air environment that is supplied and replenished from a tank 68 containing compressed air. An internal combustion engine 74 is placed in container 50 with the fuel tank positioned either inside or outside the container. A gas flow of compressed air from the air supply tank 68 through valve 62 maintains the desired air volume and pressure within the container and around the internal combustion engine.

The bottom of the container 50 or the supporting member has apertures 54 and 56 therein for allowing water to freely flow into and out of the housing, establishing a water level 58 in the housing 50. The pressure of the air in the housing controls the water level 58. Accordingly a float 60 that rides on the water level 58 is connected by linkage 61 to valve 62 and valve 62 is opened and closed depending upon the height of the water level in the housing. When the water level rises, the valve 62 is opened and compressed air in tank 68 passes through line 66 and out nozzle 64 and into the air environment of the housing 50. The operation of the engine 74 may be selectively controlled by the operated controls 82 and 84 through linkage 86.

In the operation of the embodiment of FIGURES 1 through 4, the underwater craft 10 is placed in the water in substantially the manner shown in FIGURE 1. An operator rests on the craft and has scuba diving equipment or the like to provide underwater breathing. The engine is started in the normal manner of electrical starting of outboard motors through manipulation of controls 82 and 84. The operator sits on the platform or longitudinal members 12 and rests against the housing 50 in the manner shown. Water freely enters the bottom of housing 50 and the equalizing of air pressure aginst the water pressure outside of housing 50 establishes the water level 58. As water level 58 rises in the water tight housing, float 60 rises on arm 61 opening valve 62 that allows the air under pressure in tank 68 to pass through line 66 and out through the distributing nozzle 64. Float 60 and valve 62 are responsive to the water level 58 and increase the air pressure in housing 50 to that extent required to keep the water level 58 at the desired level and thus the volume of air in the desired amount. Since the internal combusion engine 74 utilizes the air in its operation, the engine continually takes air from the air environment in its operation and exhausts the residue out through exhaust line 76. As air is used by engine 74 and exhausted through line 76 in the water, additional air is continuously provided from tank 68 in the manner previously stated.

The deeper the underwater craft maneuvers, the greater the water pressure and the greater the air pressure required within the air environment in housing 50. While this increase in air pressure has some effect on the operation of the engine, in general the depth of operation of the craft is not sufficient to seriously effect the operation of the engine. Normally in open craft such as disclosed herein, the operator limits the depth of operation. However, where the invention is used with a deeper diving underwater craft, then appropriate devices, such as an air pressure sensitive, butterfly valve, as is used in aircraft engines may be added to the carburetor. Also it should be recognized that the engine 74 can be cooled by appropriate valves and conduits taking water from the outside water environment and passing it through the engine in the normal manner of cooling marine engines. Also the temperature of the air within the housing 50 is held to a desirable temperature by outer water drawing heat from the housing 50.

Figure 4:
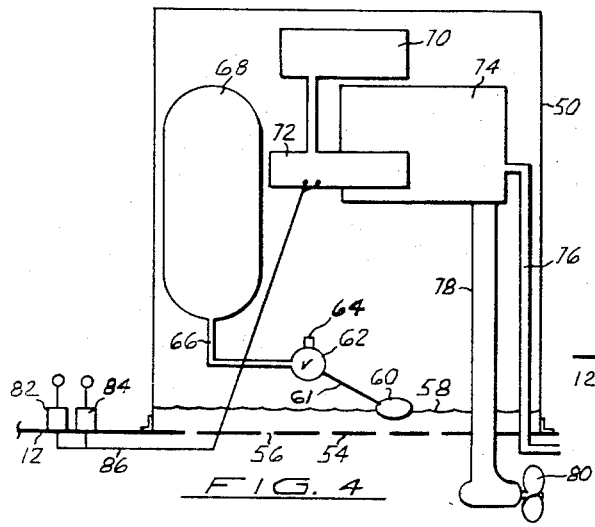
FIGURE 4 is a schematic view of an embodiment of the propulsion unit of this invention.
Figure 5:
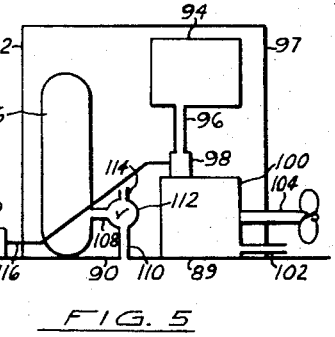
FIGURE 5 is a schematic view of another embodiment of the encapsulated propulsion unit of this invention.

Referring now to FIGURE 5, there is the same type of encapsulated engine as described in FIGURE 4, however in this embodiment the housing 97 is completely air tight with the bottom or platform 12 being sealed. The air pressure in the housing 97 is controlled by valve 112 in the manner previously described relative to FIGURE 4 except in this embodiment the valve is directly pressure actuated by the water pressure in inlet 110. As the engine uses the air in the air environment, the air is replaced from the compressed air tank 106 through line 108 and out distributing nozzle 114. As the air is taken from the air environment by the engine, the drop in air pressure increases the differential between the air pressure within the housing 97 and the outside water pressure. This pressure differential opens valve 112 allowing the air in the air environment to be replenished.

The fuel in tank 94 moves by gravity through line 96 and through the carburetor 98 into the engine. Also in the embodiment of FIGURE 5, the engine mount may be dropped to the platform 12 permitting the housing 97 to be more compact and the propeller shaft to be directly coupled to the engine without requiring the 90° turn in the transmission. Also it should be recognized that air tanks may be mounted inside the housing 97 or mounted outside the housing such as at 52 (see FIGURE 3) as an additional air supply.

Another modification of the invention is where line 110 is blocked and the valve 114 is made pressure sensitive. This permits the valve to be set to maintain the pressure of the air in the air environment at a given value. This embodiment may be used where the engine 94 that is used is particularly sensitive to change in the air-fuel mixture ratio and is not particularly sensitive to the exhaust pressure.

In general operation the underwater craft is lowered into the water and is supported by floats 18, 20 and 24. The operator climbs in and sits on the longitudinal support member 12 and the engine is started as previously described. When forward propulsion is developed, the operator moves the hand element vertically downward causing the diving plane 40 to be inclined downward causing the craft to move downward against the buoyancy of floats 18, 20 and 24. The craft may then thus be selectively maneuvered by coordinated control of the rudder and diving plane. Stabilizers 14 and 16 maintain stability of the craft while passing through the water. After the operator has finished his pleasurable trip underneath the water he may then return the craft to dock. Should the engine for any reason lose power, then the craft because of its own buoyancy will rise to the water surface as shown in FIGURE 1.

What I claim is:
1. A propulsion system for propelling an underwater craft comprising,
an air tight housing secured to said craft,
internal combustion engine means in said housing for driving said propulsion system,
compressed air source means when actuated for supplying air to said housing and said engine means while being entirely submerged,
and pressure differential means for controlling said air source means in response to the detected pressure differential between the water pressure surrounding said craft and the air pressure in said housing.

2. An underwater craft comprising,
a longitudinal member for supporting an operator,
said longitudinal member having at one end a forward support projecting upwardly at a substantially normal angle and having at the other end two stabilizers that project diagonally outward,
the ends of said forward support and said stabilizers terminating at substantially the same height above said longitudinal member,
each of said ends having float means for supporting said craft in a substantially submerged position,
said forward support having diving planes and rudder means operable by a single hand control,
and propulsion means mounted on said longitudinal member for propelling said craft under water.

3. An underwater craft comprising,
a longitudinal member for supporting an operator,
said longitudinal member having at one end a forward support projecting upwardly at a substantially normal angle and having at the other end two stabilizers that project diagonally outward,
the ends of said forward support and said stabilizers terminating at substantially the same height above said longitudinal member,
each of said ends having float means for supporting said craft in a substantially submerged position,
said forward support having diving planes and rudder means operable by a single hand control,
an encapsulated engine means mounted on said longitudinal member for propelling said craft,
said engine means including a housing mounted on said craft for providing an air environment,
an internal combustion engine positioned in said environment,
said housing having means for ejecting the exhaust of said engine directly into said water,
air source means for supplying air to said environment,
and control means for controlling the supply of said air to said environment.

4. A propulsion system for propelling an underwater craft comprising,
propulsion means for propelling said craft under water,
internal combustion engine means for driving said propulsion means,
said underwater craft having a housing for housing said engine means,
the bottom of said housing being opened to the surrounding water,
and said underwater craft having means solely within said craft for continuously supplying air to said housing during submerged propulsion for controlling the level of water in said housing and providing air for said engine means.

5. A propulsion system for propelling an underwater craft comprising,
propulsion means for propelling said craft underwater,
internal combustion engine means for driving said propulsion means,
said underwater craft having a housing for housing said engine means,
means solely in said craft for continuously supplying air to said housing for use by said engine means,
and valve means responsive to the pressure differential between the water presure outside said housing and the air pressure within said housing for controlling the supply of said air to said housing in sufficient quantities to maintain the pressure of said air substantially equal to the pressure of said water.

6. A propulsion system for propelling an underwater craft comprising,
internal combustion means for driving said propulsion system,
said underwater craft having housing means for providing an air environment for said engine, the bottom of said housing being opened to the surrounding water,
air source means capable of operating entirely underwater for supplying air to said environment,
and means for equalizing the pressure of the air in said housing means with the external water pressure at the various submerged levels of operation of said underwater craft.

7. A propulsion system for propelling an underwater craft comprising,
internal combustion engine means for driving said propulsion system,
said engine means exhausting into said water,
housing means for providing an air environment for continuous operation of said engine while said craft is submerged and for housing said engine,
the lower portion of said housing means being open to said water,
air source means capable of operating entirely underwater for continuously supplying air to said environment while said craft is submerged,
and said air source means being controlled by a control valve that responds to the level of water in said housing.

8. A propulsion system for propelling an underwater craft comprising,
an air tight housing secured to said craft,
internal combustion engine means in said housing for driving said propulsion means, air source means when actuated for supplying air to said housing and said engine means while entirely submerged, pressure control means positioned in said housing and in cooperation with said air source means for maintaining a given air pressure in said housing, said engine means exhausting directly into the surrounding water, and said pressure control means being responsive to the pressure of the surrounding water for maintaining the intake air pressure substantially equal to the pressure of the surrounding water.

References Cited
UNITED STATES PATENTS

| | | |
|---|---|---|
| 1,126,616 | 1/1915 | Cage. |
| 1,172,992 | 2/1916 | Hoar. |
| 1,870,263 | 8/1932 | Neff _____ 114—16 |
| 2,187,074 | 1/1940 | Caproni _____ 114—16 |

TRYGVE M. BLIX, *Primary Examiner.*